United States Patent [19]

Inoue et al.

[11] Patent Number: 4,704,228
[45] Date of Patent: Nov. 3, 1987

[54] LIQUID-CRYSTALLINE COMPOUNDS

[75] Inventors: Hiromichi Inoue; Masahiro Fukui; Yasuyuki Goto; Susumu Tokita, all of Kanagawaken, Japan

[73] Assignee: Chisso Corporation, Osaka, Japan

[21] Appl. No.: 688,618

[22] Filed: Jan. 3, 1985

Related U.S. Application Data

[62] Division of Ser. No. 475,529, Mar. 15, 1983, Pat. No. 4,507,222.

[30] Foreign Application Priority Data

Mar. 26, 1982 [JP] Japan .................................. 57-48395
Mar. 30, 1982 [JP] Japan .................................. 57-51822

[51] Int. Cl.$^4$ ...................... C09K 19/30; C07C 69/74; C07C 69/76
[52] U.S. Cl. ............................ 252/299.63; 252/299.5; 350/350 R; 350/350 S; 560/102; 560/118; 568/664
[58] Field of Search ......................... 252/299.5, 299.63; 560/102, 118; 568/664; 350/350 R, 350 S

[56] References Cited

U.S. PATENT DOCUMENTS

| | | | |
|---|---|---|---|
| 4,130,502 | 12/1978 | Eidenschink et al. | 252/299.63 |
| 4,181,625 | 1/1980 | Eidenschink et al. | 252/299.63 |
| 4,198,130 | 4/1980 | Doller et al. | 252/299.5 |
| 4,229,315 | 10/1980 | Krause et al. | 252/299.63 |
| 4,361,494 | 11/1982 | Osman et al. | 252/299.63 |
| 4,382,012 | 5/1983 | Eidenschink et al. | 252/299.63 |
| 4,410,445 | 10/1983 | Baur et al. | 252/299.5 |
| 4,452,719 | 6/1984 | Inoue et al. | 252/299.63 |
| 4,617,140 | 10/1986 | Eidenschink et al. | 252/299.5 |

FOREIGN PATENT DOCUMENTS

| | | | |
|---|---|---|---|
| 58981 | 9/1982 | European Pat. Off. | 252/299.63 |
| 69387 | 1/1983 | European Pat. Off. | 252/299.63 |
| 87032 | 8/1983 | European Pat. Off. | 252/299.63 |
| 2636684 | 9/1980 | Fed. Rep. of Germany | 252/299.63 |
| 3237020 | 5/1983 | Fed. Rep. of Germany | 252/299.63 |
| 56-68636 | 6/1981 | Japan | 252/299.63 |
| 57-38760 | 3/1982 | Japan | 252/299.63 |
| 57-40229 | 3/1982 | Japan | 252/299.63 |
| 57-50933 | 3/1982 | Japan | 252/299.63 |
| 57-54137 | 3/1982 | Japan | 252/299.63 |
| 57-59851 | 4/1982 | Japan | 252/299.63 |
| 57-77658 | 5/1982 | Japan | 252/299.63 |
| 57-99542 | 6/1982 | Japan | 252/299.63 |
| 57-108056 | 7/1982 | Japan | 252/299.63 |
| 58-134046 | 8/1983 | Japan | 252/299.63 |
| 58-167671 | 10/1983 | Japan | 252/299.63 |

OTHER PUBLICATIONS

Cognard, J., et al., Mol. Cryst. Liq. Cryst., vol. 68, pp. 207-229 (1981).

*Primary Examiner*—Teddy S. Gron
*Attorney, Agent, or Firm*—Fred Philpitt

[57] ABSTRACT

Compounds useful as lower viscosity liquid-crystalline components of which liquid-crystalline compositions are partly composed are provided, which compounds are liquid-crystalline compounds expressed by the general formula

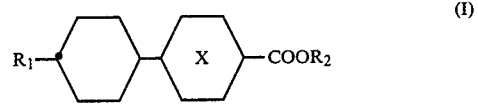

(I)

wherein

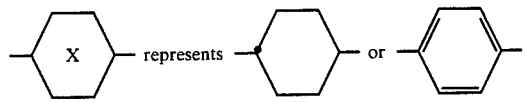

and $R_1$ and $R_2$ each represent an alkyl group of 1 to 8 carbon atoms, or liquid-crystalline compounds expressed by the general formula

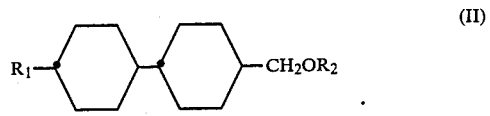

(II)

wherein $R_1$ and $R_2$ each represent an alkyl group of 1 to 8 carbon atoms.

4 Claims, No Drawings

LIQUID-CRYSTALLINE COMPOUNDS

This is a division of application Ser. No. 475,529, filed Mar. 15, 1983, now U.S. Pat. No. 4,507,222, and the benefits of 35 USC 120 are claimed relative to it.

BACKGROUND OF THE INVENTION

1. Field of the Invention

This invention relates to novel liquid-crystalline compounds useful as electrooptical display elements.

2. Description of the Prior Art

Liquid crystals which have currently been broadly used as display elements are nematic liquid crystals. When the methods of display are roughly classified, TN type (twisted nematic type), DS type (dynamic scattering type), DAP type (electric field-controlling birefringence type), PC type (cholesteric-nematic phase-transition type), GH type using dichromatic dye (guest-host type), etc. are representative. Smectic liquid crystals have so far been not broadly employed for practical uses, but it is possible to add them to nematic liquid crystals depending on their compatibility with nematic liquid crystals, to thereby improve their characteristic properties, and further, in recent years, since it has become possible to display large capacity informations by way of a matrix display utilizing an electrothermo-optic effect, their practical use has been hurried up. Furthermore a display method according to which the response speed is higher than that of TN type has been actively developed. As to liquid-crystalline materials currently used for these display elements, none of single compounds cannot endure practical use as regards their various characteristic properties i.e. liquid-crystalline temperature range, actuation voltage, response performance, etc.; thus it is the present status that compounds which endure practical use have been obtained by blending several kinds or in some case, about 20 kinds of liquid-crystalline compounds.

In particular, liquid-crystalline display elements have recently been also used for cars, etc., and those which can be used within a broader temperature range and also have a higher response speed have been needed. In order that such liquid-crystalline compositions are composed, higher temperature liquid-crystalline compounds (i.e. those of which the liquid-crystalline temperature range has a higher upper limit) and lower viscosity liquid-crystalline compounds are indispensible as their components. Usually, the former higher temperature liquid-crystalline compounds have intrinsically a higher viscosity, while the latter lower viscosity liquid-crystalline compounds such as those expressed by the formulas

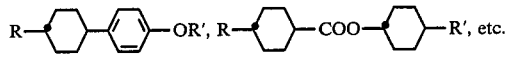

have no satisfactorily low viscosity, and also they usually have their liquid-crystalline temperature range on the lower side of such ranges to function so as to reduce the liquid-crystalline temperature range of the whole of the composition whereby their amount added is restricted. Thus, compounds having a lower viscosity and also a liquid-crystalline temperature range as high as possible have been desired.

The object of the present invention is to provide compounds which are useful as a lower viscosity liquid-crystalline component of which such liquid-crystalline compositions are partly composed.

SUMMARY OF THE INVENTION

The present invention resides in the following two aspects:

1. Liquid-crystalline compounds expressed by the general formula

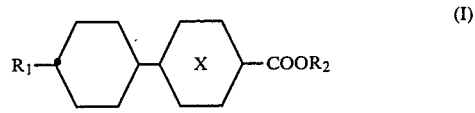

wherein

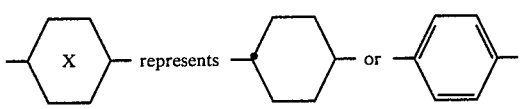

and $R_1$ and $R_2$ each represent an alkyl group of 1 to 8 carbon atoms.

2. Liquid-crystalline compounds expressed by the general formula

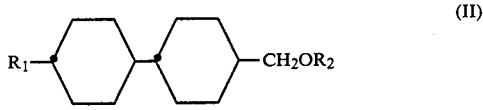

wherein $R_1$ and $R_2$ each represent an alkyl group of 1 to 8 carbon atoms.

DESCRIPTION OF THE PREFERRED EMBODIMENTS

Among the compounds expressed by the formula (I), those wherein

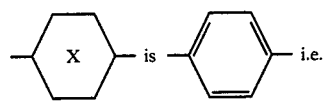

i.e. those expressed by the general formula

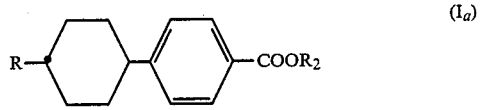

(wherein $R_1$ and $R_2$ each are as defined above) are nematic liquid-crystalline compounds.

On the other hand, those wherein

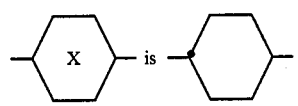

in the general formula (I) i.e. those expressed by the general formula

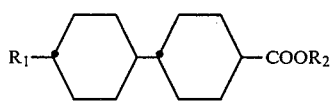

(wherein $R_1$ and $R_2$ each are as defined above) and those expressed by the general formula (II) are mainly smectic liquid-crystalline compounds.

In general, the compounds of the present invention, considering their low viscosity, are liquid-crystalline compounds having a high clearing point (N-I point or S-I point) and also a superior stability. Further, the compounds of the present invention alone cannot be practically used as a liquid crystal for display elements, but since they are superior in the compatibility with other liquid-crystalline compounds, they are used in admixture with such other liquid-crystalline compounds as biphenyl, ester, azoxy, cyclohexanecarboxylic acid ester, phenylpyrimidine, phenylcyclohexane, phenylmetadioxane liquid crystals or the like. Further, since the compounds of the present invention are superior in the response performance, particularly in the steepness property (sharpness of voltage rise) and also little in the temperature-dependency of drive voltage, they are useful as a constituent component for multiplexing drive.

Now, a prior art will be referred to wherein compounds having a similar structure to that of the compounds of the formula (II) of the present invention are disclosed. European patent application laid-open No. 58,981 (filed on Feb. 22, 1982; laid-open on Sept. 1, 1982) is directed to a very broad range of liquid-crystalline compounds containing —$CH_2O$— group. These compounds may include formally the compounds of the formula (II) of the present invention, but the specification of the prior art does not disclose at all not only values of physical properties of compounds corresponding to the compounds of the formula (II) of the present invention but also even the names of the compounds. As for compounds which are structurally similar to those of the formula (II) of the present invention, there are shown values of physical properties of compounds expressed by the following formulas (P) and (Q):

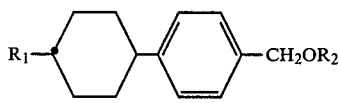

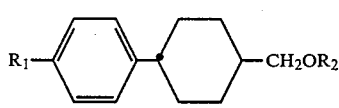

wherein $R_1$ and $R_2$ each represent an alkyl group of 1 or 2 carbon atoms. Namely the compounds of the formula (II) have two cyclohexane rings, whereas in the prior art European patent application laid-open No. 58,981, one of two six-member rings is benzene ring. The compounds of the formulas (P) and (Q) are far different from those of the formula (II) of the present invention in practical physical properties. Namely the compounds of the formula (II) have a preferable liquid-crystalline temperature range including room temperature as shown in Table 3 of Examples described later, whereas the compounds of the formulas (P) and (Q) have a N-I point as extremely low as −20° to −70° C., excluding only one exception of 7° C., as shown in Tables 1 and 2 of the specification; thus they exhibit practically a different effectiveness from that of the compounds of the formula (II) of the present invention.

Next, the preparation of the compounds of the present invention will be described.

First as to the preparation of the compounds of the formula (I), a 4-(trans-4'-alkylcyclohexyl) benzoic acid prepared by a known method is refluxed with a small amount of concentrated sulfuric acid in an aliphatic alcohol to obtain a compound of the formula ($I_a$) i.e. an alkyl ester of a 4-(trans-4'-alkylcyclohexyl)benzoic acid, while similarly a trans-4-(trans-4'-alkylcyclohexyl)cyclohexanecarboxylic acid is refluxed with a small amount of concentrated sulfuric acid in an aliphatic alcohol to obtain a compound of the formula ($I_b$) i.e. an alkyl ester of a trans-4-(trans-4'-alkylcyclohexyl)cyclohexanecarboxylic acid.

Further, the compounds of the formula (II) of the present invention can be prepared through the following steps:

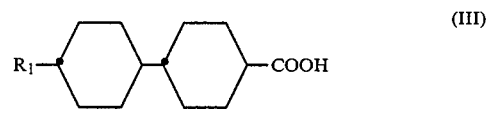

First step (CH$_3$OH, H$_2$SO$_4$)

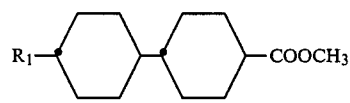

Second step (LiAlH$_4$)

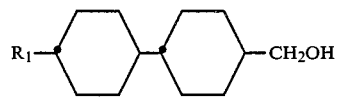

Third step (CH$_3$—⟨⟩—SO$_2$Cl)

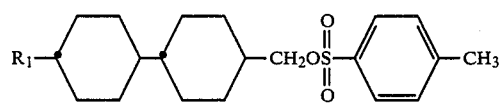

Fourth step (R$_2$ONa)

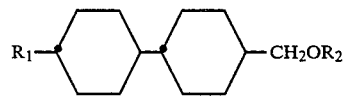

First, a trans-4-(trans-4'-alkylcyclohexyl)cyclohexanecarboxylic acid (III) prepared by a known method is heated under reflux with a small amount of sulfuric acid in methyl alcohol to obtain a trans-4-(trans-4'-alkylcyclohexyl)cyclohexanecarboxylic acid methyl ester (IV) which corresponds to a compound of the above formula ($I_b$) wherein $R_2$ is $CH_3$. This compound (IV) is reduced with a reducing agent such as lithiumaluminum hydride ($LiAlH_4$) to obtain a compound (V) which is then reacted with p-toluenesulfonyl chloride in dry pyridine to obtain a compound (VI) which is then reacted with an alcoholate to obtain an objective compound of the formula (II).

The preparation and properties of the compounds of the present invention and the use thereof as a liquid-crystalline material will be described in detail by way of Examples.

EXAMPLE 1

Preparation of trans-4-(trans-4'-propylcyclohexyl)cyclohexanecarboxylic acid methyl ester (a compound of the formula ($I_a$) wherein $R_1$ is $C_3H_7$ and $R_2$ is $CH_3$)

Methyl alcohol (200 ml) and conc. sulfuric acid (15 ml) were added to trans-4-(trans-4'-propylcyclohexyl)cyclohexanecarboxylic acid (68.2 g, 0.27 mol) and the mixture was heated under reflux for 4 hours, followed by cooling, adding water (200 ml) and toluene (100 ml), transferring the resulting mixture to a separating funnel, three times washing the toluene layer with water (each time 100 ml), distilling off toluene, adding ethyl alcohol (40 ml) to the residue, recrystallizing, filtering off and drying to obtain the objective trans-4-(trans-4'-propylcyclohexyl)cyclohexanecarboxylic acid methyl ester (65 g) (yield: 90.2%).

This product had a melting point (C-N point) of 34.2° C. and a clearing point (N-I point) of 62.8° C., and its values of elemental analysis well accorded with the calculated values as follows:

|   | Observed values (%) | Calcualted values (%) (as $C_{17}H_{30}O_2$) |
|---|---|---|
| C | 76.61 | 76.64 |
| H | 11.30 | 11.35 |

EXAMPLES 2–9

Example 1 was repeated except that trans-4-(trans-4'-propylcyclohexyl)cyclohexanecarboxylic acid or in place thereof, trans-4-(trans-4'-alkylcyclohexyl)cyclohexanecarboxylic acids having other alkyl groups were reacted with methyl alcohol or other aliphatic alcohols to obtain compounds of the formula ($I_b$). Their physical properties are shown in Table 1 together with those of the compound of Example 1.

TABLE 1

| Example | In the formula ($I_b$) $R_1$ | $R_2$ | C-S point | S-N point | C-N point | S-I point | N-I point |
|---|---|---|---|---|---|---|---|
| 2 | $C_2H_5$ | $CH_3$ | — | — | 21.5 (C-I point) | — | 19.6 |
| 1 | $C_3H_7$ | $CH_3$ | — | — | 34.2 | — | 62.8 |
| 3 | $C_3H_7$ | $C_2H_5$ | 20.1 | — | — | 57.9 | — |
| 4 | $C_3H_7$ | $C_3H_7$ | 24.4 | — | — | 53.5 | — |
| 5 | $C_4H_9$ | $CH_3$ | 34.9 | 52.0 | — | — | 62.9 |
| 6 | $C_5H_{11}$ | $CH_3$ | 40.3 | 56.9 | — | — | 77.0 |
| 7 | $C_5H_{11}$ | $C_2H_5$ | 23.1 | — | — | 80.6 | — |
| 8 | $C_5H_{11}$ | $C_3H_7$ | 34.9 | — | — | 78.6 | — |
| 9 | $C_7H_{15}$ | $CH_3$ | 52.0 | 71.9 | — | — | 79.9 |

EXAMPLE 10

Preparation of 4-(trans-4'-pentylcyclohexyl)benzoic acid methyl ester (a compound of the formula ($I_a$) wherein $R_1$ is $C_5H_{11}$ and $R_2$ is $CH_3$)

Methyl alcohol (50 ml) and conc. sulfuric acid (4 ml) were added to 4-(trans-4'-pentylcyclohexyl)benzoic acid (13.8 g, 0.05 mol) and the mixture was heated under reflux for 4 hours, followed by cooling, adding water (20 ml) and toluene (30 ml), transferring the resulting mixture to a separating funnel, three times washing the toluene layer with water (each time 20 ml), distilling off toluene, recrystallizing the residue from ethyl alcohol, filtering off and drying to obtain the objective 4-(4'-trans-pentylcyclohexyl)benzoic acid methyl ester (12.1 g) (yield: 83.6%). The product had a melting point (C-I point) of 54.2° C. and its mixture with trans-4-pentyl-1-(4-cyanophenyl)cyclohexane was measured to obtain a N-I point of 48° C. as extrapolated. The values of elemental analysis of this compound well accorded with calculated values as follows:

|   | Observed values (%) | Calculated values (%) (as $C_{19}H_{28}O_2$) |
|---|---|---|
| C | 79.10 | 79.12 |
| H | 9.75 | 9.78 |

EXAMPLES 11–18

Example 10 was repeated except that 4-(trans-4'-pentylcyclohexyl)benzoic acid or in place thereof, 4-(trans-4'-alkylcyclohexyl)benzoic acids having other alkyl groups were reacted with methyl alcohol or other aliphatic alcohols to obtain other compounds of the formula ($I_a$). Their physical properties are shown in Table 2 together with those of the compound of Example 10.

TABLE 2

| Example | In the formula ($I_a$) $R_1$ | $R_2$ | C-I point | N-I point |
|---|---|---|---|---|
| 11 | $C_3H_7$ | $CH_3$ | 39.9 | (35.0) |
| 12 | $C_3H_7$ | $C_2H_5$ | Room temp. or lower | (−18.0)* |
| 13 | $C_3H_7$ | $C_3H_7$ | Room temp. or lower | (−22.0)* |
| 10 | $C_5H_{11}$ | $CH_3$ | 54.2 | (48) |
| 14 | $C_5H_{11}$ | $C_2H_5$ | Room temp. or lower | (16.1)* |
| 15 | $C_5H_{11}$ | $C_3H_7$ | Room temp. or lower | (22.5)* |
| 16 | $C_7H_{15}$ | $CH_3$ | 42.5 | 52.2 |
| 17 | $C_7H_{15}$ | $C_2H_5$ | Room temp. or lower | (21.0)* |
| 18 | $C_7H_{15}$ | $C_3H_7$ | Room temp. | (12.5)* |

TABLE 2-continued

| | In the formula ($I_a$) | | Phase transition point (°C.) | |
|---|---|---|---|---|
| Example | $R_1$ | $R_2$ | C-I point | N-I point |
| | | | or lower | |

Symbol * indicates extrapolated values of N-I point by way of mixing of the respective compounds with

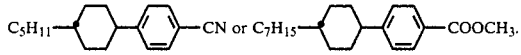
$C_5H_{11}$—⬡—⬢—CN or $C_7H_{15}$—⬡—⬢—COOCH$_3$.

EXAMPLE 19

Preparation of trans, trans-4-propyl-4'-methyloxymethylbicyclohexane (a compound of the formula (II) wherein $R_1$ is $C_3H_5$ and $R_2$ is $CH_3$)

First step:

The process is all the same as that of Example 1 as described above.

Second step:

Dry tetrahydrofuran (THF) (440 ml) was added to lithiumaluminum hydride (7.0 g, 0.188 mol) and the mixture was vigorously agitated, followed by dropwise adding thereto a solution obtained by dissolving trans-4-(trans-4'-propylcyclohexyl)cyclohexanecarboxylic acid methyl ester obtained at the first step (i.e. in Example 1) (65 g, 0.244 mol) in THF (65 ml), at a reaction temperature kept at 20° C. or lower, thereafter heating the mixture up to 55° C., reacting for 2 hours, cooling, adding ethyl acetate (13 ml) and water (100 ml) and then a 18% aqueous solution of sulfuric acid (400 ml), to give an organic layer and an aqueous layer separated from each other, adding heptane (200 ml), transferring the mixture to a separating funnel, washing with water (500 ml), further washing with a 2% aqueous solution of sodium carbonate (500 ml), further washing with water till the aqueous layer became neutral, distilling off heptane, THF, etc. under reduced pressure, recrystallizing the product remaining in the kettle from ethyl alcohol (100 ml), filtering off crystals and drying to obtain a compound of the formula (V) (49.3 g) which had a melting point of 125.8°-126.9° C.

Third step:

The compound of the formula (V) (49.2 g, 0.268 mol) was dissolved in dry pyridine (100 ml) and dry toluene (240 ml) and the solution was cooled down to 5° C. or lower, followed by dropwise adding to this solution a solution obtained by dissolving p-toluenesulfonic acid chloride (42 g, 0.216 mol) in dry toluene (70 ml), in small portions, so that the reaction temperature could not exceed 10° C., followed by removing the cooling bath, stirring at room temperature for 4 hours, adding water (100 ml) and toluene (300 ml), stirring, transferring the mixture to a separating funnel, twice washing the toluene layer with a 6N—HCl aqueous solution (100 ml), once washing with water (200 ml), further twice with a 2N—NaOH aqueous solution (100 ml), 4 times washing with water (200 ml), distilling off toluene under reduced pressure, recrystallizing the resulting crystals from ethy alcohol (200 ml), filtering off crystals and drying to obtain a compound of the formula (VI) (54 g) having a melting point of 94.8°-95.8° C.

Fourth step:

Slices of metallic sodium (1.8 g, 0.080 mol) were portionwise added to methyl alcohol (50 ml) agitated at room temperature to prepare sodium methoxide. After the metallic sodium slices disappeared, a solution obtained by dissolving the compound of the formula (VI) (24 g, 0.061 mol) obtained at the third step in dry toluene (50 ml) was gradually added through a dropping funnel so as to keep the inner temperature in the range of 50° to 60° C., followed by refluxing for 4 hours, cooling, adding water (20 ml), transferring the mixture to a separating funnel, washing the toluene layer with water till the aqueous layer became neutral, distilling off toluene under reduced pressure, distilling under reduced pressure, to collect a fraction having a boiling point of 113°-117° C./1.5 mmHg, recrystallizing crystals of this fraction from ethyl alcohol (15 ml), filtering off crystals and drying to obtain the objective compound, trans, trans-4-propyl-4'-methyloxy-methylbicyclohexane (12 g). This product exhibited a smectic phase and a nematic phase and had a melting point (C-S point) of 44.8° C., a S-N point of 51.0° C. and a clearing point (N-I point) of 52.0° C. Its values of elemental analysis well accorded with calculated values as follows:

| | Observed values (%) | Calculated values (%) (as $C_{17}H_{32}O$) |
|---|---|---|
| C | 80.86 | 80.88 |
| H | 12.75 | 12.78 |

EXAMPLES 20-27

Example 19 was repeated except that trans-4-(trans-4'-propylcyclohexyl)cyclohexane carboxylic acid or other trans-4-(trans-4'-alkylcyclohexyl)cyclohexane carboxylic acids were used and at the fourth step, methyl alcohol or other aliphatic alcohols were used to obtain compounds of the formula (II). Their physical properties are shown in Table 3 together with those of the compound of Example 19.

TABLE 3

| | In the formula (II) | | Phase transition point (°C.) | | | |
|---|---|---|---|---|---|---|
| Example | $R_1$ | $R_2$ | C-S point | S-N point | S-I point | N-I point |
| 20 | $C_2H_5$ | $CH_3$ | −14 | — | 37 | — |
| 19 | $C_3H_7$ | $CH_3$ | 44.8 | 51.0 | — | 52.0 |
| 21 | $C_3H_7$ | $C_2H_5$ | 5.8 | — | 52.4 | — |
| 22 | $C_3H_7$ | $C_3H_7$ | 14.0 | — | 43.3 | — |
| 23 | $C_4H_9$ | $CH_3$ | −21.6 | — | 61.9 | — |
| 24 | $C_5H_{11}$ | $CH_3$ | 19.6 | — | 73.4 | — |
| 25 | $C_5H_{11}$ | $C_2H_5$ | −14.8 | — | 75.4 | — |
| 26 | $C_5H_{11}$ | $C_3H_7$ | 14.3 | — | 69.3 | — |
| 27 | $C_7H_{15}$ | $CH_3$ | 27.8 | — | 70.3 | — |

In addition, the melting points of the compounds of the formulas (V) and (VI) as intermediates obtained at the second and third stages are shown in Table 4.

TABLE 4

| $R_1$ | Melting points of compounds of formula (V)(°C.) | Melting points of compounds of formula (VI)(°C.) |
|---|---|---|
| $C_2H_5$ | 116.7~120.3 | 84.9~87.1 |
| $C_3H_7$ | 125.8~126.9 | 94.8~95.8 |
| $C_4H_9$ | 132.6~133.4 | 87.8~89.9 |
| $C_5H_{11}$ | 128.7~130.0 | 91.0~94.3 |
| $C_7H_{15}$ | 119.5~120.8 | 85.6~87.1 |

EXAMPLE 28 (Use example 1)

A liquid-crystalline composition (A) consisting of

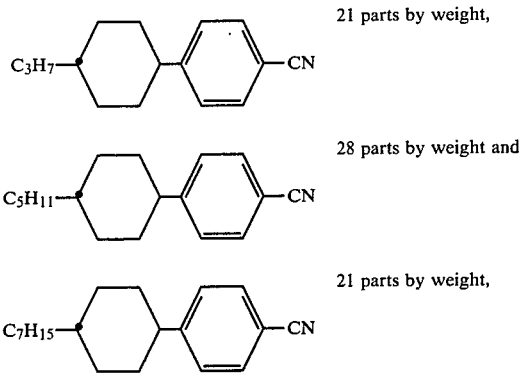

21 parts by weight, 28 parts by weight and 21 parts by weight, had a nematic liquid-crystalline temperature range (MR) of $-3°$ to $+52.5°$ C., a viscosity at 20° C. ($\rho_{20}$) of 23 cp, a dielectric anisotropy $\Delta\epsilon$ of 11.3 ($\epsilon_{\parallel}=16.2$, $\epsilon_{\perp}=4.9$) and an optical anisotropy $\Delta n$ of 0.120. When this composition was sealed in a TN cell of 10 μm thick, the resulting threshold voltage and saturation voltage were 1.5 V and 2.2 V, respectively. When the compound of Example 6 (15 parts) and that of Example 8 (15 parts), each as one of the compounds of the present invention, were added to the above composition, the resulting liquid-crystalling composition had a MR of $-3°$ to $+53.3°$ C., a $\eta_{20}$ of 20.5 cp, a $\Delta\epsilon$ of 7.9 ($\epsilon_{\parallel}=12.5$, $\epsilon_{\perp}=4.6$) and a $\Delta_n$ of 0.096, and when it was sealed in the same cell as the above, the resulting threshold voltage and saturation voltage were 1.65 V and 2.2 V, respectively. Further when the sharpness i.e. the ratio of saturation voltage to threshold voltage before the addition of the compounds of the present invention was compared with that after the addition, the property was improved from 1.47 up to 1.33.

EXAMPLE 29 (Use example 2)

To the liquid-crystalline composition (A) used in Example 28 were added the compound of Example 9 (20 parts) and that of Example 25 (10 parts), each as one of the compounds of the present invention. The resulting liquid-crystalline composition had a MR of $-10°$ C. or less to $+52.2°$ C., a $\eta_{20}$ of 17 cp and a $\Delta\epsilon$ of 7.6 ($\epsilon_{\parallel}=11.8$, $\epsilon_{\perp}=4.2$), and when this composition was sealed in the same cell as the above-mentioned, the resulting threshold voltage and saturation voltage were 1.61 V and 2.33 V, respectively.

EXAMPLE 30 (Use example 3)

A liquid-crystalline composition consisting of

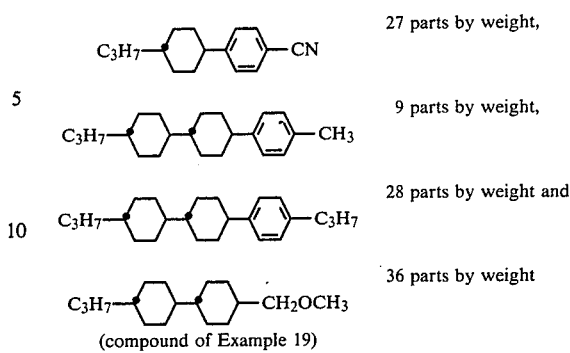

27 parts by weight, 9 parts by weight, 28 parts by weight and 36 parts by weight (compound of Example 19)

was prepared. This liquid-crystalline composition was a nematic one having a N-I point as high as 85.4° C. and nevertheless a viscosity as extremely low as 15.4 CPS (20° C.) and also a high response speed. In addition when this composition was sealed in the same cell as in Example 29 and the cell was driven, the resulting threshold voltage and saturation voltage were 2.7 V and 3.8 V, respectively.

What is claimed is:

1. A compound of the formula

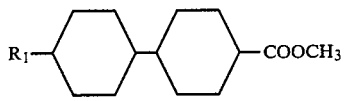

wherein $R_1$ is an alkyl group having 1–8 carbon atoms.

2. A compound of the formula

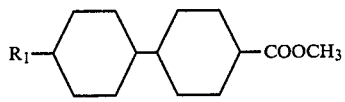

wherein $R_1$ is $C_2H_5$, $C_3H_7$, $C_4H_9$, $C_5H_{11}$ or $C_7H_{13}$.

3. A liquid crystal dielectric useful in electro optical display elements and comprising at least two liquid crystal components, wherein at least one such component is a compound of the formula

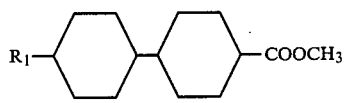

wherein $R_1$ is an alkyl group having 1–8 carbon atoms.

4. A liquid crystal dielectric according to claim 3 wherein $R_1$ is $C_2H_5$, $C_3H_7$, $C_4H_9$, $C_5H_{11}$ or $C_7H_{13}$.

* * * * *